Patented June 27, 1933

1,915,724

UNITED STATES PATENT OFFICE

ALEXIS FINKELSTEIN, OF BERNBURG, GERMANY

MANUFACTURE OF LEAD OXIDE

No Drawing. Application filed May 12, 1931, Serial No. 536,949, and in Germany May 12, 1930.

The invention relates to the manufacture of lead oxide from raw or waste material containing lead compounds and comprises a new process of recovering pure lead oxide from any of the aforesaid materials.

In accordance with my invention I treat the starting material with a hot solution of alkali hydroxide, preferably after having transformed any other lead compounds present into the oxide or hydroxide. The lead oxide or hydroxide is thus dissolved probably to form alkali plumbites. The alkaline solution is cooled down, the impurities are separated, and eventually the main part of the dissolved lead oxide is allowed to crystallize, the mother liquor being ready to be used as a solvent for a new portion of the raw material instead of fresh alkali hydroxide solution.

It is well known that solutions of alkali hydroxide dissolve a larger amount of lead oxide, probably in the form of alkali plumbite, at an elevated temperature than at a lower temperature, and that lead oxide consequently can be recrystallized from alkali lyes.

I have found that this oxide does not crystallize from hot alkali hydroxide solutions saturated with lead oxide spontaneously and immediately after cooling, but that relatively stable supersaturated solutions can be easily obtained.

I have found further that the crystallization of lead oxide from such supersaturated alkaline solutions can be initiated and accelerated by the addition of ready-formed crystals of lead oxide, a phenomenon known in other crystallization processes and designated seeding. For the purpose of seeding I prefer to use a lead oxide obtained by a preceding similar operation, i. e. by crystallization from a supersaturated alkaline plumbite solution. Crystals of lead hydroxide may be also employed as a seeding material. The amount of lead oxide or hydroxide crystals added is preferably not less than about 10 per cent of the weight of the lead oxide contained in the supersaturated solution.

The temperature at which the alkali hydroxide solution is allowed to react upon the material containing lead oxide may vary up to the boiling point of the solution.

The oxides of other metals which are dissolved by hot alkali hydroxide solutions together with the lead oxide, e. g. the oxides of antimony or bismuth, are precipitated immediately by cooling and are easy to separate from the cold supersaturated plumbite solution before the lead oxide is allowed to crystallize, the latter being then obtained in a very pure state and well adapted for use in batteries.

During the crystallization of the lead oxide the temperature may be maintained at a constant level, but it may also vary within certain limits.

The process is illustrated by the following examples, without being restricted thereto:

Example 1

Battery scrap containing 76.5 per cent by weight of Pb, 14 per cent of $SO_4$ and smaller amounts of As, Sb, Bi, Cu, Fe and Zn is treated with a solution of sodium carbonate sufficient to transform the lead sulfate into the carbonate. 70 parts by weight of the material thus obtained which consists substantially of lead oxides and lead carbonate and 15 parts of calcium oxide or the equivalent amount of calcium hydroxide are then added to 1190 parts by weight of a solution containing 200 parts of sodium hydroxide and 30 parts of lead oxide; the mixture is agitated and boiled for about 2 hours. After this time the solution containing about 86 parts of dissolved lead oxide and suspended insoluble impurities of the raw material is rapidly cooled down to room temperature, i. e. about 15 to 20° C., whereby a precipitate containing As, Sb, Bi and Fe is formed. The precipitate is then removed from the solution by decantation and filtration. The clear solution still contains 85 parts of lead oxide. Now 8 parts of crystallized lead oxide are added. After 12 hours stirring 47 parts of pure lead oxide have crystallized; they are separated by decanting and filtering and dried. The mother liquor containing 32 grams of Pb per liter is re-used for extracting a new portion of scrap material.

Example 2

100 parts by weight of the same battery scrap as described in the foregoing example are stirred with 300 parts of an aqueous ammoniacal liquor containing 17 grams of $NH_3$ in one liter. By this treatment the sulfate of lead is transformed into an insoluble basic sulfate nearly corresponding to the formula $7Pb(OH)_2$, $PbSO_4$. This basic sulfate is separated from the ammonium sulfate solution and decomposed by stirring it with 300 parts of a 1.5 per cent sodium hydroxide solution. After removing the sodium sulfate solution, the residue is treated in accordance with the process described in the first example, the amount of calcium oxide being reduced to one fourth of the figure given above.

The concentration of the alkali hydroxide solution employed in my process may vary within wide limits, the best results being obtained with concentrations between about 150 and 250 grams of sodium hydroxide in 1000 cubic centimeters.

The alkaline solutions need not be entirely saturated with lead oxide at or near the boiling point, but it is an essential feature of my invention that the lead oxide content is higher than that corresponding to saturation at the temperature at which the crystallization is to be performed.

I claim:

1. In the manufacture of pure lead oxide the steps which comprise saturating a hot alkali hydroxide solution with lead oxide, cooling down the solution, removing any precipitate and allowing the lead oxide to crystallize from the resulting supersaturated solution.

2. In the manufacture of pure lead oxide the steps which comprise saturating a hot alkali hydroxide solution with lead oxide, cooling down the solution, removing any precipitate and promoting the crystallization of lead oxide by seeding of the resulting supersaturated solution with crystals of lead oxide.

3. In the manufacture of pure lead oxide the steps which comprise saturating a hot alkali hydroxide solution with lead oxide, cooling down the solution, removing any precipitate and promoting the crystallization of lead oxide by seeding of the resulting supersaturated solution with crystals of lead oxide obtained by a process in accordance with claim 1.

4. In the manufacture of pure lead oxide the steps which comprise saturating with lead oxide at elevated temperature an alkali hydroxide solution containing lead oxide in a concentration lower than that corresponding to saturation, cooling down the solution, removing any precipitate and allowing the lead oxide to crystallize from the resulting supersaturated solution.

5. In the manufacture of pure lead oxide the steps which comprise boiling an aqueous solution containing sodium hydroxide with a solid material containing a lead compound until the alkaline solution is substantially saturated with lead oxide, cooling down the solution, removing any precipitate and allowing the lead oxide to crystallize from the resulting supersaturated solution.

In testimony whereof, I affix my signature.

ALEXIS FINKELSTEIN.